United States Patent
Karroll, Jr. et al.

(10) Patent No.: US 10,929,092 B1
(45) Date of Patent: Feb. 23, 2021

(54) MUSIC NETWORK FOR COLLABORATIVE SEQUENTIAL MUSICAL PRODUCTION

(71) Applicant: Collabra LLC, Louisville, KY (US)

(72) Inventors: Ronald Karroll, Jr., Louisville, KY (US); Ariel Caplan, Louisville, KY (US)

(73) Assignee: Collabra LLC, Louisville, KY (US)

( * ) Notice: Subject to any disclaimer, the term of this patent is extended or adjusted under 35 U.S.C. 154(b) by 0 days.

(21) Appl. No.: 16/259,894

(22) Filed: Jan. 28, 2019

(51) Int. Cl.
    *G06F 3/16* (2006.01)
    *G10H 1/00* (2006.01)
    *H04L 29/08* (2006.01)

(52) U.S. Cl.
    CPC .......... *G06F 3/165* (2013.01); *G10H 1/0008* (2013.01); *H04L 67/104* (2013.01)

(58) Field of Classification Search
    CPC .. G10H 1/0008; G10H 1/0025; G10H 1/0058; G10H 2240/175; G10H 2240/305; G10H 2240/311; G10H 2240/325; H04L 65/60; H04L 65/80; H04L 65/403; H04L 67/06; H04L 67/42; H04L 67/104; H04L 43/087; H04L 43/10; G06F 16/639; G06F 16/64; G06F 3/165
    USPC ......... 84/609, 615, 622, 625, 645, 649, 653, 84/659, 660; 381/119; 700/94; 707/E17.102; 709/204, 217
    See application file for complete search history.

(56) References Cited

U.S. PATENT DOCUMENTS

| | | | |
|---|---|---|---|
| 6,653,545 B2 * | 11/2003 | Redmann | G10H 1/0058 84/609 |
| 7,518,051 B2 | 4/2009 | Redmann | |
| 7,531,737 B2 | 5/2009 | Ide et al. | |
| 7,714,222 B2 | 5/2010 | Taub et al. | |
| 7,790,975 B2 | 9/2010 | Eastwood et al. | |
| 7,853,342 B2 | 12/2010 | Redmann | |
| 8,119,900 B2 | 2/2012 | Skillings | |
| 8,153,878 B2 | 4/2012 | Chevreau et al. | |
| 8,247,676 B2 | 8/2012 | Georges et al. | |
| 8,283,545 B2 | 10/2012 | Humphrey | |
| 8,338,686 B2 | 12/2012 | Mann et al. | |
| 8,487,173 B2 | 7/2013 | Emmerson | |
| 8,618,404 B2 | 12/2013 | O'Dwyer | |
| 8,653,349 B1 | 2/2014 | White et al. | |
| 8,653,351 B2 | 2/2014 | Skillings | |

(Continued)

*Primary Examiner* — Duc Nguyen
*Assistant Examiner* — Alexander L Eljaiek
(74) *Attorney, Agent, or Firm* — Law Office of J.L. Simunic; Joan Simunic

(57) ABSTRACT

The present invention is a method and a computer program for allowing individual artists to produce a latency corrected collaborative audio work by providing a first artist the opportunity to create a base track which may then be accessed by additional artists who can add audio tracks which harmonize with the base track. Artists may add synchronized tracks to the base track at any time from a remote location thereby allowing artists in different geographical locations to produce a collaborative work of art simultaneously or over an extended time period. The present invention includes a novel method for latency correction, which corrects for delays caused by various types of user equipment, and ensures each track is properly synchronized with the others. The present invention also includes a novel interface where a slot machine or slider user interface allows for ease of use from a browser.

13 Claims, 7 Drawing Sheets

(56) References Cited

U.S. PATENT DOCUMENTS

| | | | |
|---|---|---|---|
| 8,785,760 B2 | 7/2014 | Serletic et al. | |
| 8,935,020 B2 | 1/2015 | Wiemeyer et al. | |
| 9,812,105 B2 | 11/2017 | Vorobyev | |
| 2009/0106429 A1 | 4/2009 | Siegal et al. | |
| 2010/0319518 A1 | 12/2010 | Mehta | |
| 2015/0256613 A1* | 9/2015 | Walker | G06F 16/639 709/217 |
| 2018/0233119 A1* | 8/2018 | Patti | H04L 67/06 |

* cited by examiner

Alternative Branch Example

Branch consists of the following leaves:

Rock Guitar > Chil Drums > Chill Bass > Chill Vocals

US 10,929,092 B1

MUSIC NETWORK FOR COLLABORATIVE SEQUENTIAL MUSICAL PRODUCTION

BACKGROUND OF THE PRESENT INVENTION

The present invention is a music network comprising a method and a computer program for allowing individual artists to produce a collaborative audio work by providing a first artist the opportunity to create a base track which may then be accessed by additional artists who can add audio tracks which harmonize with the base track. Artists may add synchronized tracks to the base track at any time from a remote location via web-based networking thereby allowing artists in different geographical locations to produce a collaborative work of art simultaneously or in an asynchronous manner. Artists may select any combination of tracks to produce a finished piece.

Over the past couple decades access to the internet has become essentially universal. Use of the internet, and of networking systems generally, and the ubiquity of the "cloud" has greatly expanded opportunities for people at remote locations to produce collaborative works. For example, it is now commonplace for an individual at a site in the United States to produce a written document in electronic format and send that document to a colleague in a different country who may amend the document and further forward it until an acceptable document is prepared. Alternatively, it is now possible for a group of individuals, wherein each individual is in a different geographic location around the world, to create and edit a document at the same time, and to see each other's edits in real-time. Due to flexibility offered by electronic formats, the authors do not need to be at the same location nor do they need to be working on the document at the same time; each person may participate at his or her own convenience, or together at the same time.

Although various audio files types are available, such as MPEG-3, AIFF and WAV, producing musical pieces in a sequential process has proven to be more challenging than producing a text document. As each musician adds a track from his or her location, computer hardware tends to introduce delays and/or volume variations that can prevent a particular track from harmoniously combining with other tracks in a file. Because these variations arise from the artist's equipment, it may not be apparent that there is a synchronization problem until an attempt is made to combine tracks together to produce a single finished piece.

Further, the mood of a musical work of art is dependent on the instrumentation and rhythm of the piece. Thus, one artist's expectation of the finished work may different from another artist's expectation.

SUMMARY OF THE PRESENT INVENTION

The present invention is a music network comprising a method and a computer program for allowing individual artists to produce a latency corrected collaborative audio work by providing a first artist the opportunity to create a base track which may then be accessed by additional artists who can add audio tracks which synchronize with the base track. Because each subsequent synchronized track is separate from the base track and from each other, a single base track may be used to produce a vast array of finished pieces depending on which tracks are combined. The result is that musical artists, music professionals and fans can explore creative possibilities of making music.

The present invention includes a novel interface where a slot machine or slider user interface allows for ease of use from a browser. The present invention also includes a novel method for latency correction, which corrects for delays caused by various types of user equipment, and ensures each track is properly synchronized with the others.

DETAILED DESCRIPTION OF THE PREFERRED EMBODIMENT

The present invention is a method and a computer program for allowing individual artists to produce a collaborative audio work by providing a first artist the opportunity to create a base track which may then be accessed by additional artists who can add audio tracks which synchronize with the base track, and each track is more accurately synchronized using a method of latency compensation or correction than if no latency correction is applied. In a preferred embodiment, the present invention provides a collaborative music network for musical artists, which comprises a central control center and at least one communication center linked to the central control center.

The central control center is an electronic database which serves as the primary repository of the base track and of the harmony tracks. The database may house a plurality of files, each containing one or more tracks. Preferably, the database is adapted to allow a plurality of artists access thereto through electronic or digital communication. In a preferred embodiment, each artist may access the database to produce a new base track, or to add an audio track to harmonize with a previously deposited base track, or to create a musical work by selecting at least one track.

The communication center is electronically or digitally linked to the central control center. Through the communication center, the individual artist can gain access to the central control center. Once connected to the central control center, the artist may select to create a base track, or to add a synchronized track to an already existing base track, or to select one or more tracks to create a finished piece. A representative networking system to allow the individual artist access to the central control center is described in U.S. Published Application 2009/0106429, which is incorporated by reference in its entirety.

Figure 1:
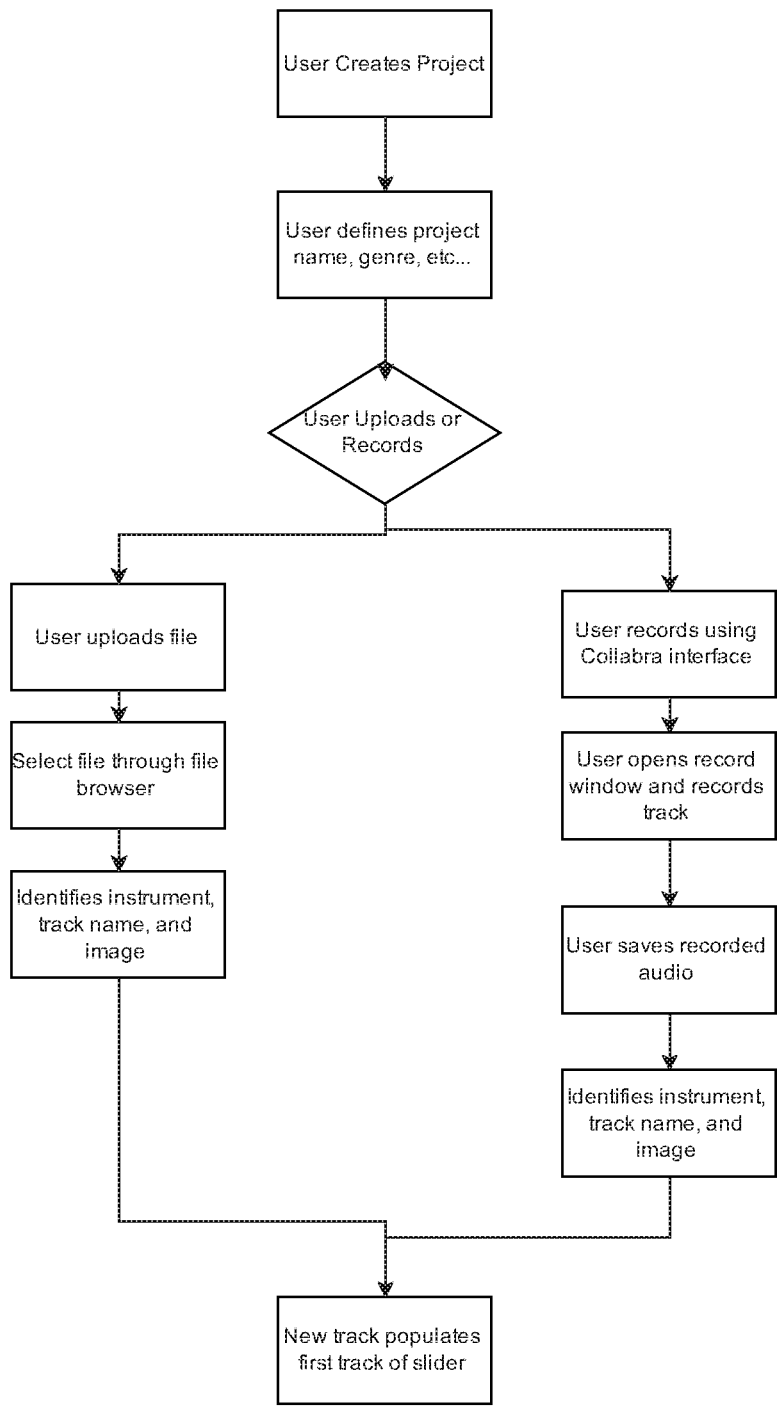
FIG. 1 is a flow chart of a music network of the present invention setting forth the details of a session creating a base track.

As shown in FIG. 1, an artist creates a project and assigns a project designation, such as a project name or other identifier. The artist then may create a base track by creating a sound track directly through use of a browser or by uploading an audio file to the central control center, or alternatively may create a base track by directly recording into the file through a user interface. After creating the base track, the artist optionally can categorize the base track, such as by identifying the instrument, assigning a track name, and/or including an image. The base track populates a first slider, or recording site, on the project.

Figure 2:
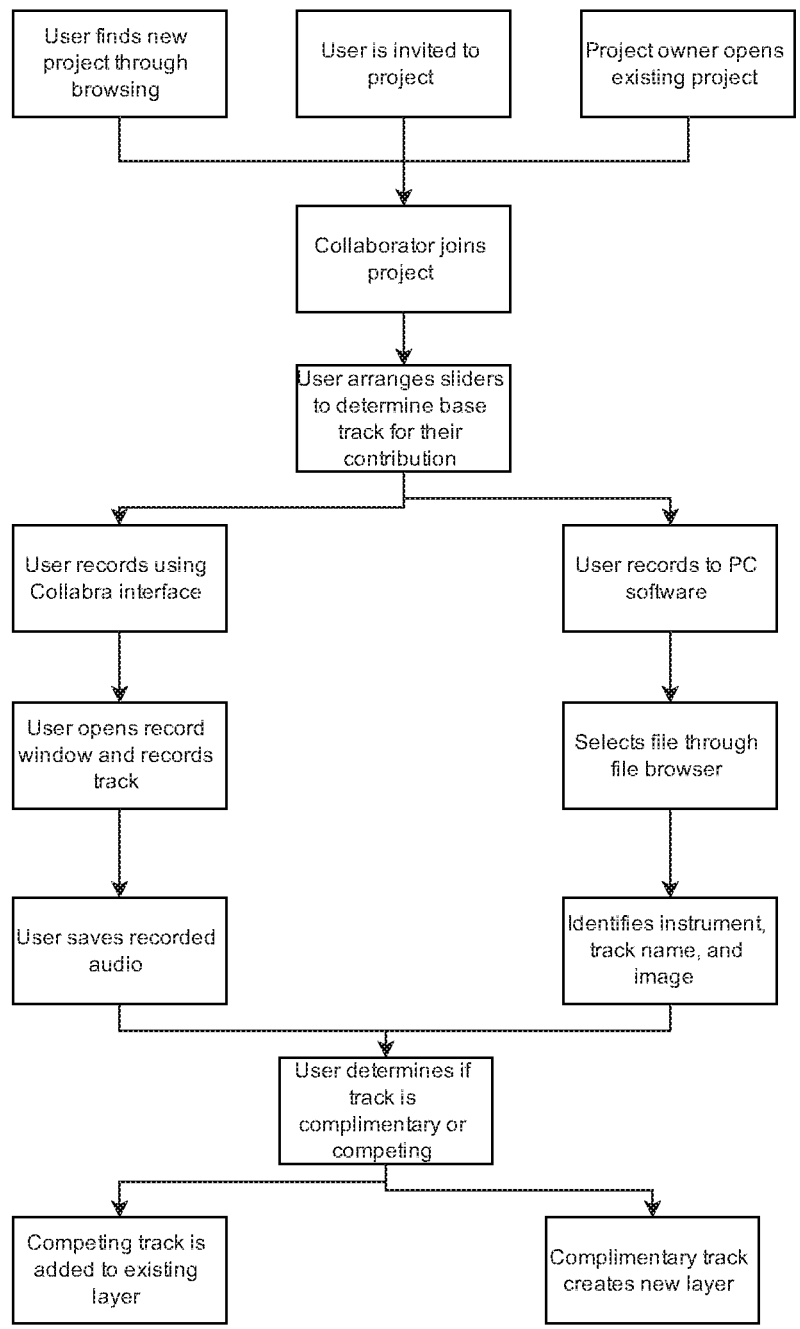
FIG. 2 is a flow chart of the music network of the present invention setting forth the details of a session adding a subsequent audio track to the base track created in FIG. 1.
Figure 3:
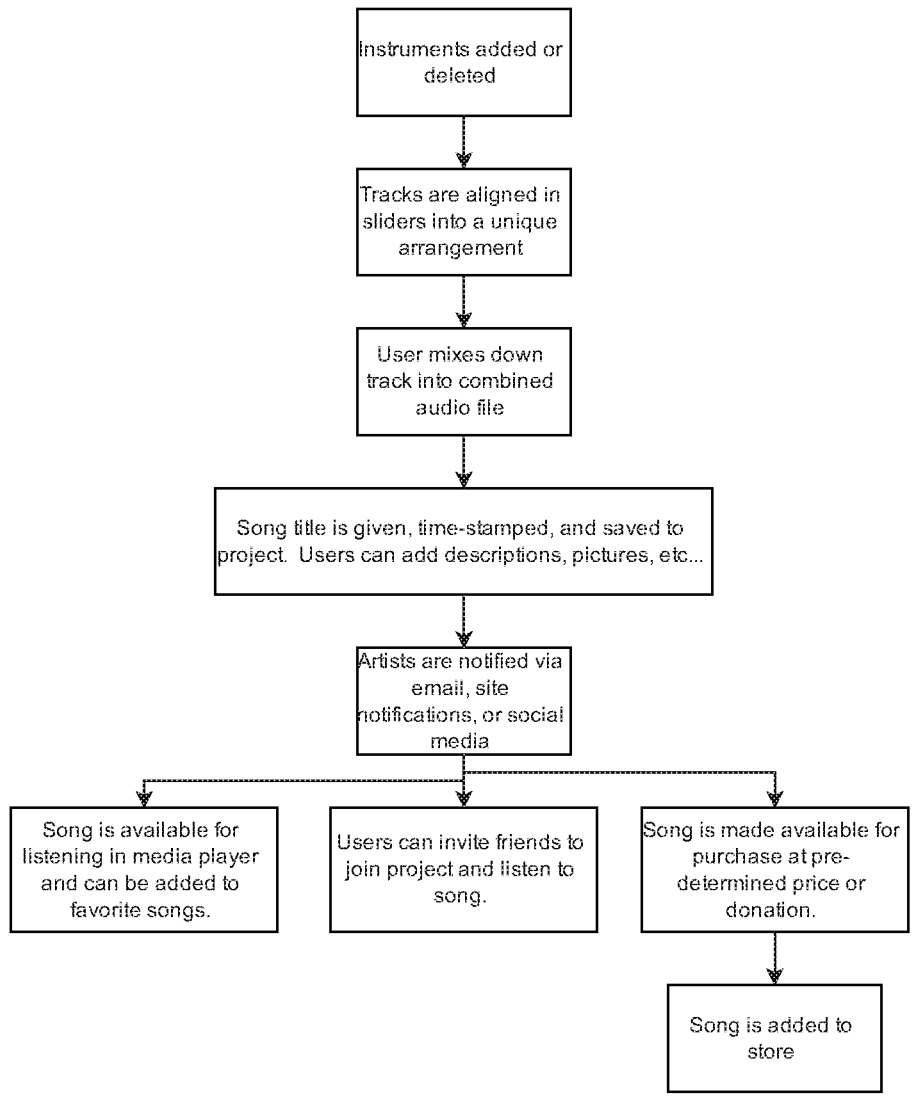
FIG. 3 is a flow chart of the music network of the present invention setting forth the details of a session to produce a collaborative audio work.

Referring to FIGS. 2 and 3, the same artist or a second artist may then create a first synchronized track by contemporaneously recording a musical composition while listening to the audio file of the base track. The artist may also create a second synchronized track by contemporaneously recording a musical composition while listening to the audio file of the base track or the first synchronized track or a combination thereof. Subsequent harmony tracks may be created in a similar manner while the artist listens to at least one previously recorded track. The first harmony track and any subsequent tracks may be recorded through a user's PC software of through a user interface within the recording program. The artist can then categorize the harmony track as a competing track or a complimentary track. Competing tracks are added to existing layer(s). Complimentary tracks create a new layer to the base track.

The individual artist may manage a number of variables in the present invention. The artist may edit, mix and record audio files existing in the session console, which could include volume and pan on an individual track level, mute and solo, and volume tracking over time, cropping, looping, zoom, pitch manipulation, audio clip tempo manipulation, metronome, snap-to-grid, plug-in support, chromatic tuner, audio effects, importing and exporting to and from desktop software programs, midi sequencing, chat, video chat, video file support, etc. The computer program of the present development specifically allows the artist to alter a gain control setting, to arrange various musical audio tracks to create a novel musical composition, and to do on-line mixing and recording.

Gain control is a feature that allows the computer microphone (or external microphone) to increase or decrease the amount of audio signal that is received. The gain control functions to allow artists to select an appropriate setting to increase recording volume without admitting too much audio signal and causing distortion in the recording. In the present invention, the gain control is altered by use of a visual scale that allows the artist to manually select the optimum level.

Figure 4:
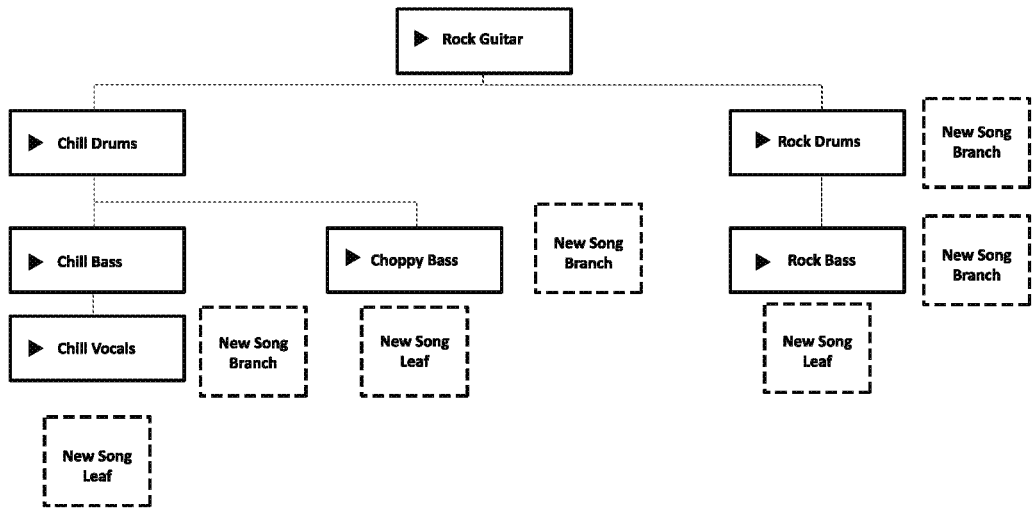
FIG. 4 is an example of a tree diagram for selecting components for a composition.
Figure 5:
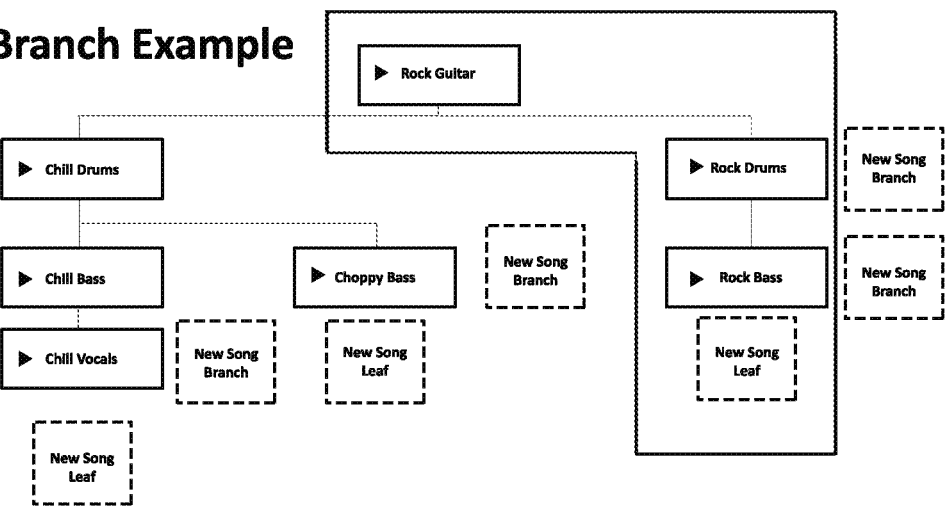
FIG. 5 is an example of a first instrument selection option using the tree diagram of FIG. 4.
Figure 6:
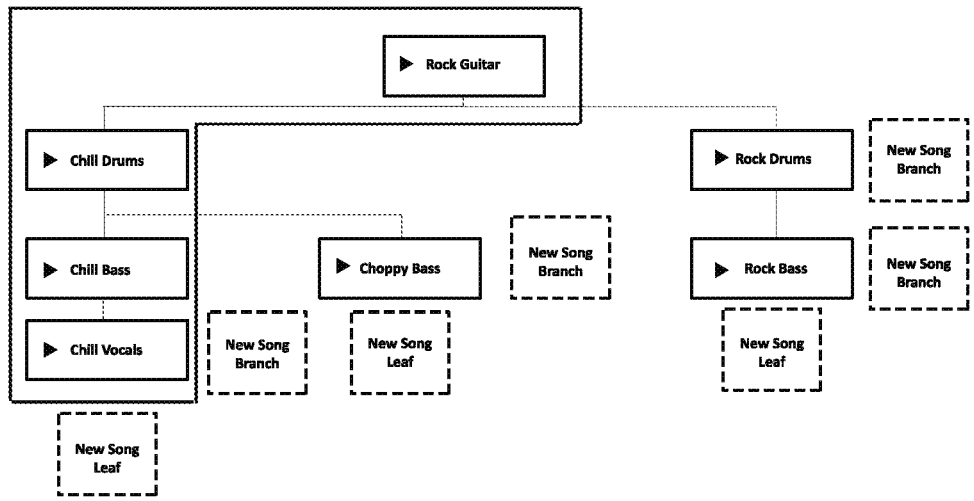
FIG. 6 is an example of a second instrument selection option using the tree diagram of FIG. 4.
Figure 7:
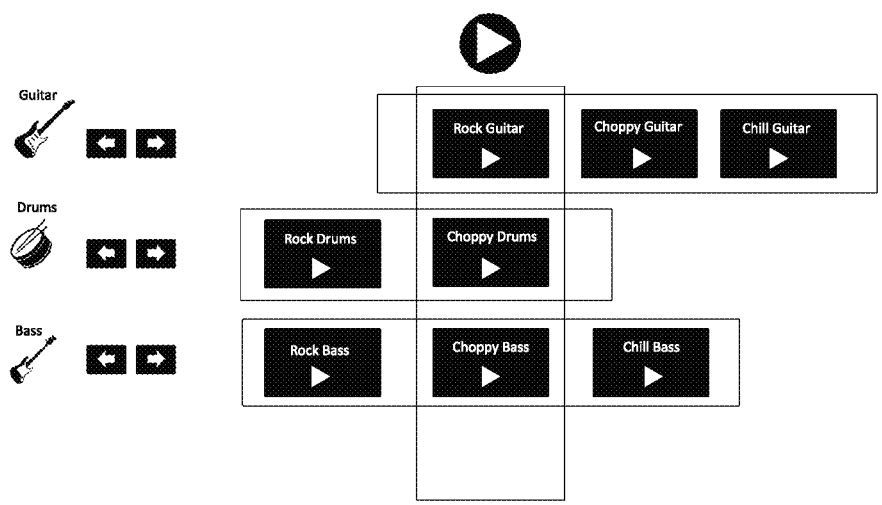
FIG. 7 is an example of a slider diagram for selecting components for a composition.
Figure 8:
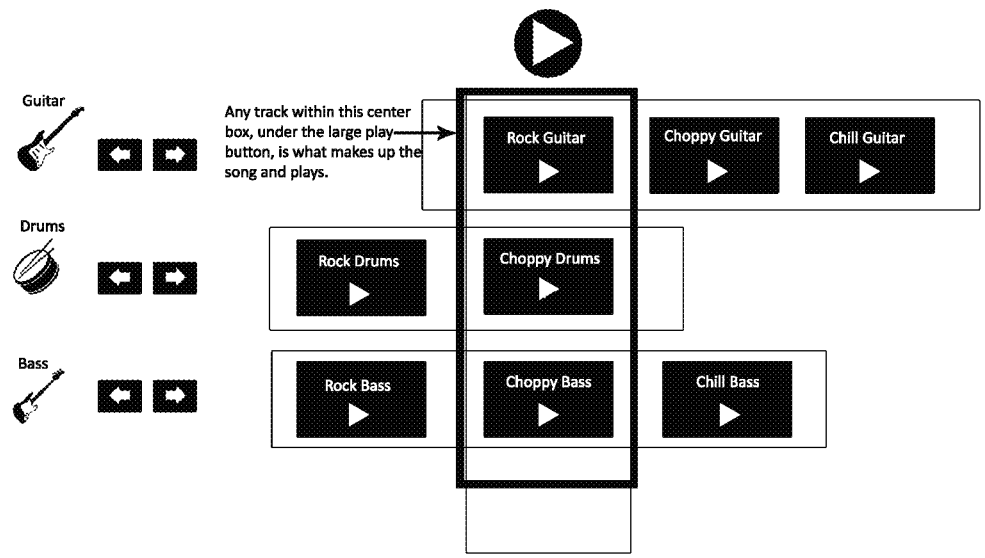
FIG. 8 is an example of a first instrument selection option using the slider diagram of FIG. 7.
Figure 9:
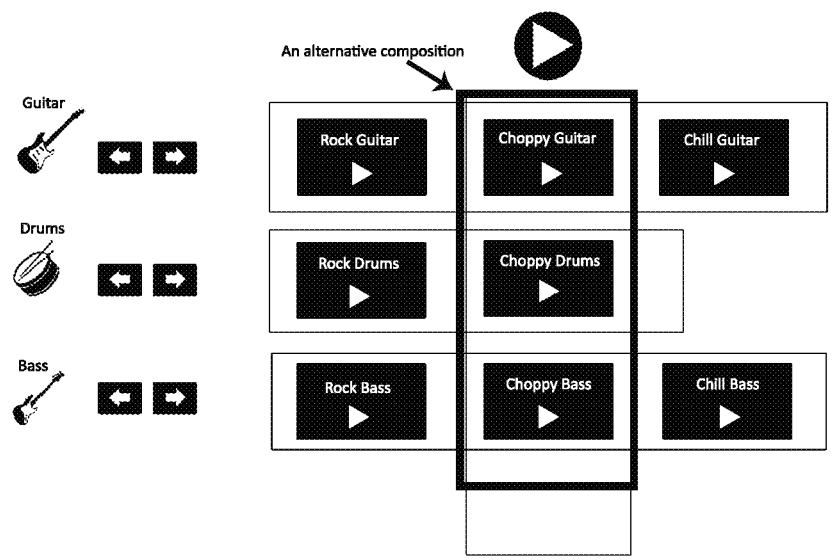
FIG. 9 is an example of a second instrument selection option using the slider diagram of FIG. 7; and, FIG. 10 features alternatives to instrumental tracks in the slider diagram of FIG. 7.
Figure 10:
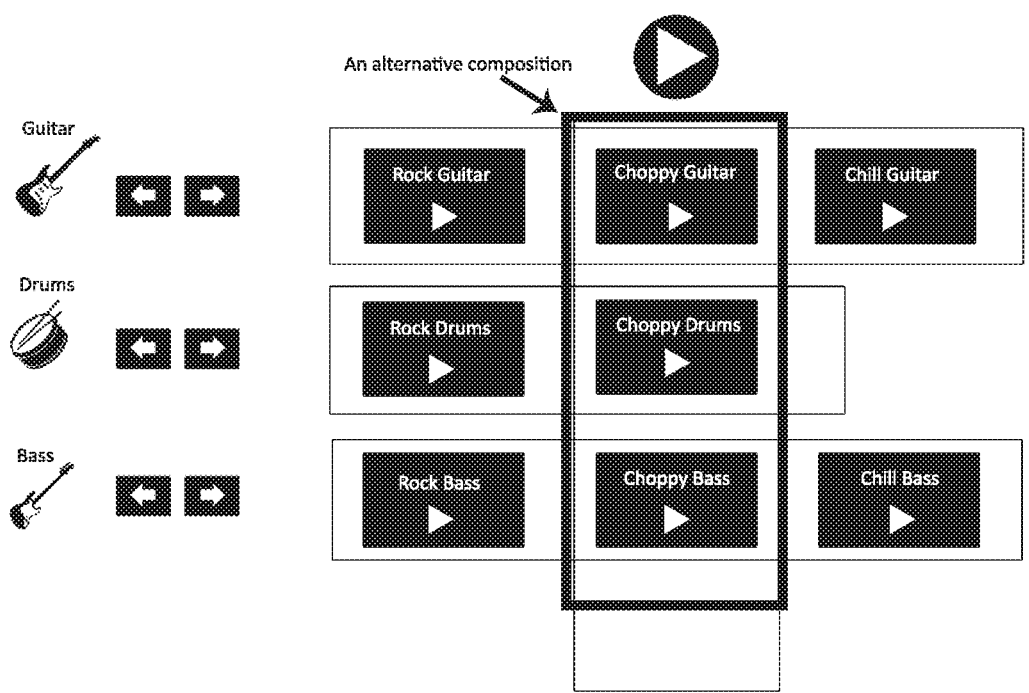

The present invention optionally utilizes a tree diagram, such as shown in FIG. 4, with at least one node. The tree diagram is a visual format that allows the artist to arrange various musical audio tracks such that each node on the tree diagram, or those places within the tree diagram where the tree branches, represents a different audio contribution to the project. As shown in FIGS. 5 and 6, branches of the tree represent a unique mix of the various audio tracks into an arrangement of a given song. The audio tracks are populated into the tree diagram when an artist uploads/records a new track, and then places that track into the appropriate spot within the tree diagram. The placement of the track determines if the new audio track is competing with other audio for a given spot within the song arrangement or if the track is complementary to the various other tracks. Tracks within the diagram can be played separately, played in combination, and selected for manipulation of volume, panning, and other basic audio listening functions. Tracks may also be selected from within the tree diagram for the purposes of linking to online recording, social networks, and feedback comments.

As shown in FIGS. 7-10, the audio track selection function of the present invention may also include a slot machine design, which is a visual format for arranging audio tracks within a song project, which will be referred to herein as a "slider". Visually, the slider appears as a plurality of separate boxes, each representing a particular audio contribution to the project. The boxes are arranged into various rows. Each row of boxes represents audio tracks that are competing for the same role within a song (e.g. lead guitar). Subsequent rows are added for new instruments within the song. One column of boxes, the play column, is selected as an arrangement of the audio tracks from each row. A song composition is generated by selecting one track from at least one row into the play column of tracks. Each row of boxes can be manipulated left and right in order for the artist to select the desired audio track and move it into the play column. Artists may also be able to select tracks from within this visualization for purposes of audio manipulation, such as volume, panning, etc., and for selecting tracks for online recording, social networks, and feedback comments. Particular arrangements of songs can be stored within the project and, when selected, that arrangement will automatically cause the boxes within the slot machine to move into the appropriate position for that arrangement.

Mixing is the functionality for artists to be able to manipulate audio files in various aspects within the webpage. This includes a visual display showing each audio track separately as a wave form corresponding to the particular recording. The wave forms are stacked on top of each other and are able to be manipulated separately. The manipulations can include audio control (volume, panning, etc.) selecting portions of audio tracks for deletion, copy-paste looping, and adjusting the timing of when audio begins play. Within this same environment the artist is able to record new tracks, if desired, wherein the artist can listen to the tracks being mixed and record a new audio track while listening to the mix. The new audio track is upload to the webpage and automatically populates a new track and waveform image of the recording in order for the artist to continue mixing the new track in with the existing arrangement of tracks.

The audio latency adjustment corrector is a feature that automatically corrects for disjointed timing between the audio tracks played online and the recorded track that the artist creates. When an artist selects musical tracks that he or she wants to record over, those musical tracks are sent to the artist's client, such as a browser, which then can be played while recording an additional musical track layered over it. Unadjusted, the completed recording would be anywhere from 40 to 400 milliseconds off from what a user would expect to hear. A difference of 20 milliseconds is enough for the human ear to detect a noticeable drift between the timing of instrumentation. This drift is due primarily to insufficient mainstream audio recording hardware and equipment, and limited access to a computer's operating systems' audio pipeline from within the browser. The larger the drift, the more likely the musical piece will be disjointed and not reflective of the artist's intent. To combat this, and in lieu of limited access that the browser has to the operating systems' audio recording pipeline, the present inventive method was developed to subtract the estimated latency from the beginning of every subsequently recorded track that is sent to the network. This estimated latency is calculated via the following procedure:

a. While waiting for a countdown before audio is actually recorded, i.e. the time immediately preceding the beginning of the actual recording, the network will force the artist's browser to repetitively alternate the gain control setting between zero and 100%, alternating multiple times per second, wherein "multiple" is defined as from at least two times per second, and preferably as about four times per second to about six times per second. The total time that it takes the gain control setting to switch from zero to 100% and back to zero is measured and defined as time $t_1$. The time $t_1$ is compared to the actual results value that occur from the gain control setting change, wherein the actual results value or $t_{as}$ refers to a value equal to the difference in time between when the gain control setting is adjusted and when the impact on the sound wave occurs due to that adjustment, and wherein s is a number indicating the ordinal number of the actual results value so that $t_{a1}$ is a first actual results value and $t_{a2}$ is a second actual results value, and $t_{a3}$ is a third actual results value, etc. The difference, expressed as a positive value, between time $t_1$ and the actual results value $t_{as}$ is defined as $t_{mx}$, wherein x is a number indicating the number of comparisons made between time $t_1$ and $t_{as}$, so the first comparison or $|t_1-t_{a1}|$ would be $t_{m1}$ and the second comparison or $|t_1-t_{a2}|$ would be $t_{m2}$ and third comparison or $|t_1-t_{a3}|$ would be $t_{m3}$ and so forth. Essentially, by measuring the impact of the gain control setting changes, and specifically gain control setting changes from zero to 100% and then from 100% back to zero as quickly as possible, on the amplitude of the sound currently traveling through a microphone before recording actually begins, it is possible to compare the known time of the gain control setting change with the time in which the resulting amplitude change is reflected in the audio reaching the user's computer, and the difference between the two is an approximation of the audio latency resulting from the artist's recording hardware. The aforementioned measurement and comparison is performed multiple times prior to the user recording and an average value for all $t_{mx}$ collected is calculated and is then stored as the "estimated latency value" and is later used in the correction of audio latency.
   b. Once the average estimated latency value, reported in milliseconds, is determined in the above procedure, the estimated latency average value is stored and sent with the finished recording to a processing server. The server then applies the latency average value to the newly recorded or finished product audio file by reducing the time period at the beginning of the synchronized track by the latency average value to create the desired result of the synchronized track: a track where the artist's belief of where the beat is and what is recorded is less than 20 milliseconds in difference, and therefore essentially indistinguishable to the human brain.

This approach for audio latency adjustment is different from two popularly used latency compensation methods, and far easier for the user. Current methods require either 1) a guide track, i.e. a track manually lined up by the user, wherein the artist is required to visually determine the offset; or, 2) the availability of a recording suite that has access to the ASIO or similar sound card drivers, something that cannot be requested or enforced via a web browser. With the present inventive method, when the newly created track is subsequently uploaded to the webpage, the embedded signature is used to align the new track with the tracks the artist wants to add onto so that all audio files play at the correct time and thus correcting for the latency that would normally occur without this correction.

It will thus be seen that the objects of the present invention have been fully and effectively accomplished. The embodiments have been shown and described for the purposes of illustrating the functional and structural principles of the present invention and is subject to change without departure from such principles. Further, one skilled in the art will understand that the embodiment of the present invention as shown in the drawings and described above is exemplary only and not intended to be limiting. Therefore, this invention includes all modifications encompassed within the spirit and scope of the following claims.

What is claimed is:

1. A music network comprising:
   a. a non-transitory computer-readable medium storing a computer program for creating a musical work;
   b. a central control center housing the non-transitory computer-readable medium;
   c. a communication center electronically or digitally linked to the central control center providing at least one artist access thereto and providing the artist access to the computer program, wherein the artist:
      i. uses a browser to create or upload one or more audio base tracks to an artist-selected file stored in the central control center or creates the audio base track by directly recording into the selected file through a user interface; and,
      ii. creates a first synchronized track by contemporaneously recording a musical composition while listening to the audio base track and storing the first synchronized track to the artist-selected file containing the audio base track or to a separate file stored in the central control center; and,
   d. a gain control setting functionality that allows the artist to select a setting between zero and 100%;
   and wherein the computer program comprises:
   a. an audio latency adjustment calculator that automatically corrects for disjointed timing between the audio base track and the synchronized track by:
      i. identifying a beginning point for the audio base track;
      ii. forcing the browser to repetitively alternate the gain control setting between zero and 100% at least two times per second while the artist listens to the audio base track;
      iii. measuring a total time that it takes the gain control setting to switch from zero to 100% and back to zero, wherein the total time is defined as time $t_1$;
      iv. when the artist begins creating the synchronized track identifying a beginning point for the synchronized track;
      v. determining an actual results value that is equal to the difference in time between when the gain control setting is adjusted and when an impact on a sound wave occurs due to that adjustment, wherein the actual results value is defined as $t_{as}$ and wherein s is a number indicating the ordinal number of the actual results value;
      vi. calculating an absolute value between time $t_1$ and $t_{as}$, wherein the absolute value is defined as $t_{mx}$ and wherein x is a number indicating the number of comparisons made between time $t_1$ and $t_{as}$;

vii. calculating an average value for all $t_{mx}$ collected and defining the average value as an estimated latency value and storing the estimated latency value within the computer program;

viii. subtracting the estimated latency value from the beginning of the synchronized track and embedding a digital signature on the synchronized track; and, ix. aligning the embedded signature on the synchronized track with the beginning point of the audio base track to effectively remove the estimated latency value; and, b. at least one finished product audio file to allow the artist to create a finished piece by selecting the audio base track and at least one synchronized track to combine with the audio base track for simultaneous download.

2. The music network of claim 1 wherein the artist's browser is forced to repetitively alternate the gain control setting between zero and 100% up to six times per second.

3. The music network of claim 1 wherein the estimated latency value is calculated in units of milliseconds.

4. The music network of claim 1 further comprising a track selection option.

5. The music network of claim 4 wherein the track selection option is a tree diagram functionality, wherein the tree defines nodes, and wherein artists can arrange various musical audio tracks in a song project such that each node on the tree diagram represents a different audio contribution to the project.

6. The music network of claim 4, wherein the track selection option is a slot machine diagram functionality, wherein the slots define nodes, and wherein artists can arrange various musical audio tracks in a song project such that each node on the slot machine diagram represents a different audio contribution to the project.

7. The music network of claim 1 wherein the gain control setting functionality uses a slider that allows the artist to select a setting manually.

8. The music network of claim 1 further comprising a functionality that visually allows the artist to arrange audio tracks within a song project, and wherein said visual functionality comprises separate boxes arranged in a plurality of rows, wherein each row of boxes represents an audio track for a particular role within a song, and wherein said artist may align boxes from different rows in a column to create a musical composition.

9. The music network of claim 1 wherein the at least one artist is a first artist and one or more additional artists.

10. The music network of claim 1 wherein the artist can categorize the base track by identifying an instrument or by assigning a track name or by including an image or by any combination thereof.

11. The music network of claim 1 wherein a musical composition is created by combining at least one audio base track with at least two synchronized tracks.

12. The music network of claim 1 further comprising an on-line mixing and recording functionality, wherein the mixing and recording functionality includes a visual display showing each audio base track and each synchronized track separately as a wave form corresponding to a particular recording, wherein the wave forms are stacked on top of each other and may be manipulated separately.

13. The music network of claim 1 wherein the finished product audio file has the synchronized track and the audio base track aligned with less than a 20 millisecond latency delay.

\* \* \* \* \*